(12) United States Patent
Ni

(10) Patent No.: US 10,454,336 B2
(45) Date of Patent: Oct. 22, 2019

(54) ROTOR AND PROCESSING AND ASSEMBLING METHOD THEREFOR

(71) Applicant: KINGCLEAN ELECTRIC CO., LTD., Suzhou, Jiangsu (CN)

(72) Inventor: Zugen Ni, Jiangsu (CN)

(73) Assignee: KINGCLEAN ELECTRIC CO., LTD., Suzhou, Jiangsu (CN)

( * ) Notice: Subject to any disclaimer, the term of this patent is extended or adjusted under 35 U.S.C. 154(b) by 180 days.

(21) Appl. No.: 15/313,236

(22) PCT Filed: May 6, 2015

(86) PCT No.: PCT/CN2015/078342
§ 371 (c)(1),
(2) Date: Nov. 22, 2016

(87) PCT Pub. No.: WO2015/180557
PCT Pub. Date: Dec. 3, 2015

(65) Prior Publication Data
US 2017/0141641 A1 May 18, 2017

(30) Foreign Application Priority Data

May 28, 2014 (CN) .......................... 2014 1 0230951

(51) Int. Cl.
*H02K 5/16* (2006.01)
*H02K 1/22* (2006.01)
(Continued)

(52) U.S. Cl.
CPC ................ *H02K 5/161* (2013.01); *A47L 9/22* (2013.01); *H02K 1/22* (2013.01); *H02K 1/28* (2013.01);
(Continued)

(58) Field of Classification Search
CPC ........ H02K 5/161; H02K 7/083; H02K 7/085; H02K 15/03; H02K 1/28; H02K 15/02;
(Continued)

(56) References Cited

U.S. PATENT DOCUMENTS 5,381,066 A * 1/1995 Miyaji .................. F16C 33/765
310/90
5,459,361 A * 10/1995 Morioka ................ H02K 5/124
310/67 R
(Continued)

FOREIGN PATENT DOCUMENTS

CN 101064465 A 10/2007
CN 201307782 Y 9/2009
(Continued)

OTHER PUBLICATIONS

Received STIC search report from EIC 2800 searcher Mesfin Getaneh on Jul. 3, 2018.*
(Continued)

*Primary Examiner* — Nguyen Tran
*Assistant Examiner* — Htet Z Kyaw
(74) *Attorney, Agent, or Firm* — Cantor Colburn LLP

(57) ABSTRACT

A rotor applicable to a vacuum cleaner motor includes a rotating shaft, a rotor magnetic steel, a load blade, two bearings between the rotor magnetic steel and the load blade, and a pre-tightening spring for providing precompressions to the bearings at two sides. The bearings are arranged between the load blade and the rotor magnetic steel, so that the motor structure is simplified, the overall size of the motor is reduced, and the machining and manufacturing of the vacuum cleaner motor are facilitated. As the pre-tightening spring is arranged between the two bearings, the bearings are close to the load blade as much as possible under the effect of pre-tightening force.

7 Claims, 1 Drawing Sheet

(51) Int. Cl.

| | | |
|---|---|---|
| *H02K 15/02* | (2006.01) | |
| *A47L 9/22* | (2006.01) | |
| *H02K 1/28* | (2006.01) | |
| *H02K 7/08* | (2006.01) | |
| *H02K 15/03* | (2006.01) | |
| *H02K 7/14* | (2006.01) | |
| *H02K 15/14* | (2006.01) | |

(52) U.S. Cl.
CPC ............ *H02K 7/083* (2013.01); *H02K 7/085* (2013.01); *H02K 15/02* (2013.01); *H02K 15/03* (2013.01); H02K 5/163 (2013.01); *H02K 7/14* (2013.01); *H02K 15/14* (2013.01)

(58) Field of Classification Search
CPC ............ H02K 1/22; H02K 5/163; H02K 7/14; H02K 15/14; A47L 9/22
USPC .......................................... 310/90, 60 A, 61
See application file for complete search history.

(56) References Cited

U.S. PATENT DOCUMENTS

| | | | | |
|---|---|---|---|---|
| 5,482,188 | A * | 1/1996 | Lina .................... | B05B 11/3025 222/321.2 |
| 5,559,382 | A * | 9/1996 | Oku ...................... | F16C 17/026 310/67 R |
| 5,596,235 | A * | 1/1997 | Yazaki .................. | H02K 5/124 310/67 R |
| 5,686,771 | A * | 11/1997 | Ishizuka .............. | H02K 5/1737 310/67 R |
| 5,880,545 | A * | 3/1999 | Takemura ............ | F16C 33/765 310/67 R |
| 6,353,275 | B1 * | 3/2002 | Nishiyama ........... | H02K 1/2706 310/156.21 |
| 6,392,324 | B1 * | 5/2002 | Kuwahara ............ | H02K 1/2773 310/156.11 |
| 6,630,758 | B2 * | 10/2003 | Aoki ..................... | F16C 35/067 310/67 R |
| 6,700,240 | B2 * | 3/2004 | Akiwa .................. | H02K 1/187 310/156.06 |
| 7,667,358 | B2 * | 2/2010 | Okazaki ................ | H02K 3/24 310/52 |
| 8,931,595 | B2 * | 1/2015 | Koma .................... | F16N 11/02 184/5.1 |
| 9,124,157 | B2 * | 9/2015 | Yamaguchi ........... | H02K 1/276 |
| 9,586,130 | B1 * | 3/2017 | Qin ........................ | A63C 17/12 |
| 2001/0045782 | A1 * | 11/2001 | Lieu .................... | G11B 19/2009 310/67 R |
| 2003/0048965 | A1 | 3/2003 | Miyazaki et al. | |
| 2007/0052310 | A1 | 3/2007 | Sakai et al. | |
| 2007/0075597 | A1 * | 4/2007 | Seidler ................. | F04D 13/02 310/67 R |
| 2007/0252486 | A1 | 11/2007 | Kobayashi | |
| 2008/0291574 | A1 * | 11/2008 | Obara .................... | F16C 17/107 360/224 |
| 2009/0001843 | A1 * | 1/2009 | Enomoto ............... | H02K 1/145 310/257 |
| 2009/0102304 | A1 * | 4/2009 | Yamamura ............ | H02K 1/278 310/156.28 |
| 2009/0160277 | A1 * | 6/2009 | Obara .................... | F16C 17/026 310/90 |
| 2010/0074777 | A1 * | 3/2010 | Laufer .................... | F04D 13/12 417/420 |
| 2010/0215491 | A1 | 8/2010 | Mockridge et al. | |
| 2013/0052051 | A1 * | 2/2013 | Clothier ................ | F04D 25/06 417/366 |
| 2013/0108200 | A1 * | 5/2013 | Berns .................... | F16C 33/7806 384/477 |
| 2013/0129506 | A1 * | 5/2013 | Nguyen-Schaefer ....................... | F01D 25/166 415/229 |
| 2013/0223997 | A1 * | 8/2013 | Childe .................. | F16C 27/066 415/170.1 |
| 2014/0125208 | A1 * | 5/2014 | Yamashita ............. | F02C 6/12 310/68 B |
| 2015/0110659 | A1 * | 4/2015 | Saga ...................... | F04C 2/3441 418/26 |
| 2015/0180293 | A1 * | 6/2015 | Schmid .................. | H02K 1/32 310/216.004 |
| 2017/0313378 | A1 * | 11/2017 | Abrantes Perfeito ........................ | B62M 3/003 |

FOREIGN PATENT DOCUMENTS

| | | |
|---|---|---|
| CN | 101645636 A | 2/2010 |
| CN | 102414461 A | 4/2012 |
| CN | 203896063 U | 10/2014 |
| CN | 104283344 A | 1/2015 |
| EP | 2562425 A2 | 2/2013 |
| EP | 2562426 A2 | 2/2013 |
| EP | 2562436 A1 | 2/2013 |
| JP | H06121478 A | 4/1994 |
| JP | 2000346085 A | 12/2000 |
| JP | 2013211987 A | 10/2013 |

OTHER PUBLICATIONS

Received STIC search report from EIC 2800 searcher Mesfin Getaneh dated Jan. 31, 2019. (Year: 2019).*

Extended European Search Report corresponding to Application No. 15799678.6-1809/3151385 PCT/CN2015078342; dated Dec. 21, 2017.

International Search Report corresponding to Application No. PCT/CN2015/078342; dated Jul. 17, 2015, with English translation.

* cited by examiner

ROTOR AND PROCESSING AND ASSEMBLING METHOD THEREFOR

This application is the national phase of International Application No. PCT/CN2015/078342, titled "ROTOR AND PROCESSING AND ASSEMBLING METHOD THEREFOR", filed on May 6, 2015, which claims the benefit of priority to Chinese patent application No. 201410230951.8, titled "ROTOR AND MACHINING AND ASSEMBLING METHOD THEREFOR", filed with the Chinese State Intellectual Property Office on May 28, 2014, the entire disclosures of both applications are incorporated herein by reference.

FIELD

The present application relates to the technical field of machining and manufacturing motor rotors of vacuum cleaners, and particularly relates to a rotor and a method for machining and assembling the rotor.

BACKGROUND

A vacuum cleaner is an electric cleaning apparatus which utilizes a motor to drive blades to rotate at a high speed, to generate a negative air pressure in a sealed housing, and thereby suctioning dusts into a dust bag. Vacuum cleaners can be generally divided into vertical type vacuum cleaners, horizontal type vacuum cleaners, and portable type vacuum cleaners and the like according to the structure. With vacuum cleaners become miniaturized and portable, the improvement in structure and volume of a vacuum cleaner motor, as a core component of a vacuum cleaner, also attracts lots of attentions.

A conventional vacuum cleaner motor generally includes a stator iron core and a rotor, the rotor is fixed on an output rotating shaft, and a load blade is further fixedly arranged on the rotating shaft. Bearings of the rotating shaft are placed at an outer side of each of the load blade and the rotor, that is, at two ends of the rotating shaft, such bearing arrangement is not compact. To fix the bearings, one of the bearings is fixed by a motor hood, and the other bearing needs to be fixed by an additional end cover, thus the structure is complicated and the volume is large. Also, if this structure is employed, the distance between the bearings is generally set large, which may cause a significant vibration and a high noise when the motor operates, and adversely affect the normal use of the vacuum cleaner, and thus is apt to cause premature damage and aging of parts and components in the vacuum cleaner motor, and reduces the service life of the vacuum cleaner.

For avoiding the structural limitations of the conventional vacuum cleaner motor, a motor structure is disclosed in the conventional technology. In the motor structure, one bearing is employed, and the bearing is fixed to a middle part of the rotating shaft, and a load and a rotor are arranged at two ends of the rotating shaft. In this way, to fix the bearing, the bearing can be directly fixed to a motor cover, without additionally providing a component to fix the bearing, thus simplifying the structure of the motor, allowing the entire motor to be compact, and reducing its volume. However, for ensuring the stability and balance in operation of the motor, generally, the bearing is required to be made long, which may lead to a high material cost of the bearing, and an increased production cost of the vacuum cleaner motor.

Therefore, in view of the above issues, it is necessary to provide a new rotor structure, to simplify the structure of the motor, reduce the overall volume of the motor, to enable the bearing to be close to a load as much as possible, reduce the wobble at shaft ends of the rotor, lower the noise, improve the service life of the motor, and also save the material, and reduce production costs.

SUMMARY

In view of this, a rotor is provided according to the present application, in which, bearings are arranged between a load blade and a rotor magnetic steel, to effectively eliminate structural limitations in the conventional technology, simplify the structure of a motor, and reduce an overall volume of the motor. A pre-tightening spring is arranged between two bearings, to enable the bearings to be close to the load blade as much as possible, thereby reducing the wobble at shaft ends of the rotor, lowering the noise, and improving the service life of the motor. The two bearings and the pre-tightening spring cooperatively function, thereby ensuring the operational stability, and meanwhile, effectively saving the material and reducing production costs.

A rotor is provided according to an object of the present application, and is applicable to a vacuum cleaner motor. The rotor includes a rotating shaft, a rotor magnetic steel, a load blade, two bearings between the rotor magnetic steel and the load blade, and a pre-tightening spring for providing precompressions to the bearings at two sides.

Preferably, the rotor magnetic steel, the load blade, and the bearings are all fixedly sleeved on the rotating shaft.

Preferably, an outer side of the rotating shaft is provided with grooves in circumferences corresponding to the rotor magnetic steel, the load blade and the bearings, and adhesive is filled in the grooves.

Preferably, the groove is a pit or a channel, and the pit is one pit or a plurality of pits arranged in a circumferential direction of the rotating shaft, and the channel is one channel or a plurality of channels arranged in the circumferential direction of the rotating shaft.

Preferably, the groove is an annular groove arranged in a circumferential direction of the rotating shaft, one or a plurality of annular grooves are provided, and the plurality of annular grooves are arranged in parallel with each other and are arranged at equal intervals.

Preferably, the groove has a rectangular, arc-shaped, U-shaped or polygonal cross section.

Preferably, the pre-tightening spring is at least one pre-tightening spring pressed between the two bearings, and in a case that a plurality of pre-tightening springs are provided, the plurality of pre-tightening springs are arranged side by side.

Preferably, two ends of the pre-tightening spring press tightly on outer races of the bearings respectively.

Preferably, opposite sides of the two bearings are each provided with a retainer ring configured to prevent dust.

A method for machining and assembling a rotor includes the following steps:

(1) machining and forming a rotating shaft, determining positions for fixing bearings, a rotor magnetic steel and a load blade on the rotating shaft, and machining and forming at least one groove at each of the fixing positions;

(2) filling adhesive in the grooves; and (3) fixing the load blade, a retainer ring, one bearing, a pre-tightening spring, another bearing, a retainer ring and the rotor magnetic steel respectively to the rotating shaft in the listed sequence, and meanwhile ensuring that the pre-tightening spring is in a pressed state.

Compared with the conventional technology, the rotor disclosed in the present application has the following advantages.

1. The bearings are arranged between the load blade and the rotor magnetic steel, thereby effectively eliminating structural limitations in the conventional technology, simplifying the structure of the motor, reducing an overall volume of the motor, and facilitating the machining and manufacturing of the vacuum cleaner motor.

2. The pre-tightening spring is arranged between the two bearings, and the pre-tightening force of the pre-tightening spring enables the bearings to be close to the load blade as much as possible, thereby reducing the wobble at shaft ends of the rotor, lowering the noise, reducing damages to the motor and improving the service life of the motor.

3. The two bearings and the pre-tightening spring cooperatively function, thereby ensuring the operational stability, and meanwhile effectively saving the material and reducing production costs.

4. An outer side of the rotating shaft is provided with grooves at circumferences corresponding to the rotor magnetic steel, the load blade and the bearings, and adhesive is filled into the grooves, to fix the components on the rotating shaft to the rotating shaft. Further, the provision of the grooves may further avoid spillage of the adhesive, and ensure the stability of the connection between the rotating shaft and the components thereon.

BRIEF DESCRIPTION OF THE DRAWINGS

For more clearly illustrating embodiments of the present application or technical solutions in the conventional technology, drawings referred to describe the embodiments or the conventional technology will be briefly described hereinafter. Apparently, the drawings in the following description are only some examples of the present application, and for the person skilled in the art, other drawings may be obtained based on these drawings without any creative efforts.

Figure 1:
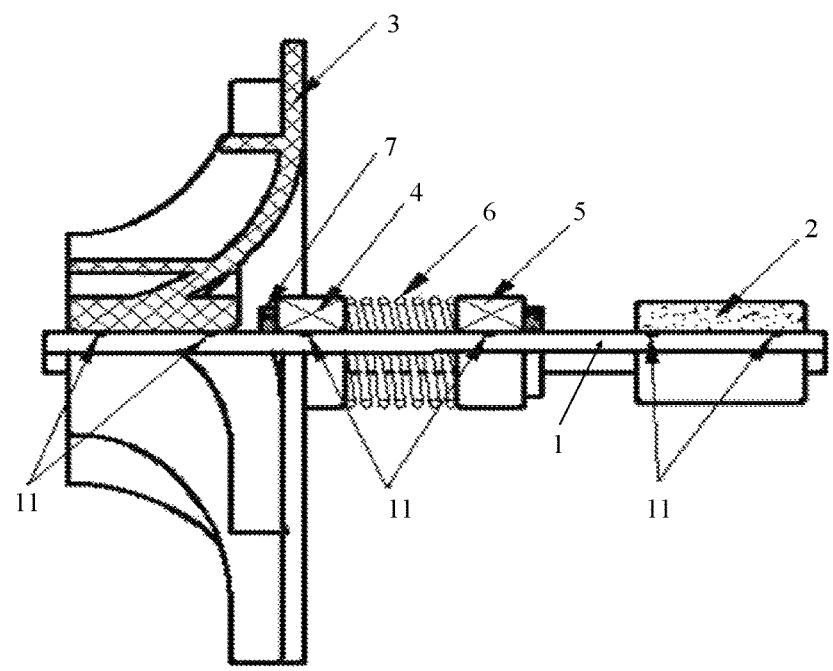
FIG. 1 is a schematic view showing the structure of a rotor disclosed in the present application.

Names of components denoted by reference numerals or letters in the drawings:

| 1 | rotating shaft, | 2 | rotor magnetic steel, |
|---|---|---|---|
| 3 | load blade, | 4 | upper bearing, |
| 5 | lower bearing, | 6 | pre-tightening spring, |
| 7 | retainer ring, and | 11 | groove. |

DETAILED DESCRIPTION

In a conventional motor of a vacuum cleaner, bearing are placed at two ends of a rotating shaft, such bearing arrangement is not compact and is complicated and has a large volume. Also, since the distance between the bearings is large, the motor may cause a large vibration and a high noise in operation, thus adversely affecting the normal use of the vacuum cleaner, and reducing the service life of the vacuum cleaner. In a motor structure disclosed in the conventional technology, one bearing is fixed to a middle part of the main shaft, and a load and a rotor are respectively arranged at two ends of the rotating shaft. However, for ensuring the stability and balance in operation of the motor, the bearing is required to be made long generally, which leads to a high material cost for the bearing, and an increased production cost of the motor of the vacuum cleaner.

In view of the deficiencies in the conventional technology, a rotor is provided according to the present application, in which, bearings are arranged between a load blade and a rotor magnetic steel, to effectively eliminate structural limitations in the conventional technology, simplify the structure of a motor, and reduce an overall volume of the motor. A pre-tightening spring is arranged between two bearings, to enable the bearings to be close to the load blade as much as possible, thereby reducing the wobble at shaft ends of the rotor, lowering the noise, and improving the service life of the motor. The two bearings and the pre-tightening spring cooperatively function, thereby ensuring the operational stability, and meanwhile, effectively saving the material and reducing production costs.

The technical solutions of the present application will be clearly and completely described hereinafter in conjunction with embodiments. Apparently, the embodiments described are only several examples of the present application, rather than all implementations. Other embodiments obtained by the person skilled in the art based on the embodiments of the present application without any creative efforts all fall into the scope of the present application.

As shown in FIG. 1, a rotor, applicable to a motor of a vacuum cleaner, includes a rotating shaft 1, a rotor magnetic steel 2 fixedly sleeved on the rotating shaft 1, a load blade 3, two bearings arranged between the rotor magnetic steel 2 and the load blade 3, and a pre-tightening spring 6 arranged between the two bearings and providing precompressions to the bearings at two sides respectively, and the two bearings include an upper bearing 4 and a lower bearing 5.

The bearings are arranged between the load blade 3 and the rotor magnetic steel 2, thus the overall structure of the motor is compact, the structure of the motor is simplified, and the volume of the motor is reduced, and the structural limitations in the conventional technology are effectively eliminated, thereby facilitating machining and manufacturing the vacuum cleaner motor and improving the production efficiency.

The pre-tightening spring 6 is arranged between the two bearings, and the precompressions towards the two sides generated by the pre-tightening spring 6 drive the bearings to be close to the load blade as much as possible, thereby reducing the wobble at shaft ends of the rotor and the noise, reducing damages to the motor and improving the service life of the motor.

The two bearings and the pre-tightening spring cooperate to form an integral body, which, compared with the structure using one entire long bearing in the conventional technology, employs less material, effectively saves the material, and reduces the production costs. Furthermore, the combination of the two bearings and the pre-tightening spring has a large overall length, generally takes up ⅓ of the whole length of the rotating shaft, and thus may effectively ensure the balance and stability of the rotating shaft in operation. In addition to the pre-tightening spring, the pre-tightening component between the two bearings may also be embodied as elastic elements such as rubber, which is not limited specifically.

The pre-tightening spring 6 may be embodied as at least one pre-tightening spring pre-compressed between the two bearings, and in the case that the pre-tightening spring 6 is embodied as multiple pre-tightening springs, the multiple pre-tightening springs are arranged side by side, and are ensured to have approximate outer diameters, thus effectively ensuring pre-tightening forces of the springs.

Two ends of the pre-tightening spring 6 press tightly on outer races of the bearings. The outer diameter of the pre-tightening spring may be equal to or slightly smaller than outer diameters of the outer races of the bearings, as long as it can ensure that the pre-tightening spring can be in effective contact with the outer races of the bearings, and the specific dimension of the pre-tightening spring is not limited.

Figure 2:
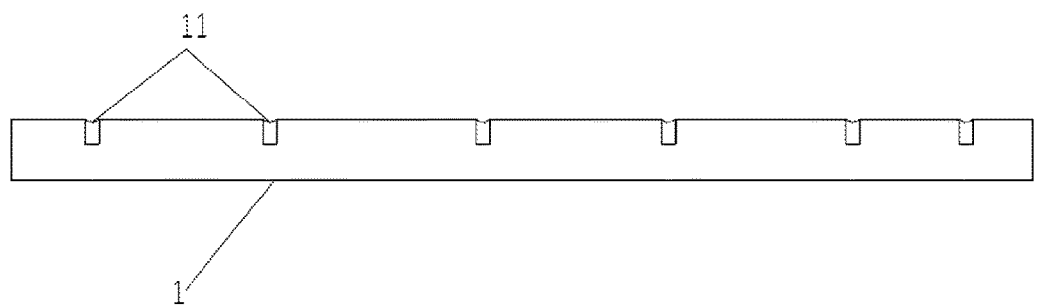
FIG. 2 is a schematic view showing the structure of a rotating shaft.

As shown in FIG. 2, an outer side of the rotating shaft 1 is provided with grooves 11 at circumferences corresponding to the rotor magnetic steel 2, the load blade 3 and the bearings, and adhesive is filled into the grooves, to fix the components on the rotating shaft to the rotating shaft. Further, the provision of the grooves may further avoid spillage of the adhesive, and ensure the stability of the connection between the rotating shaft and the components thereon. The adhesive may be glue, etc.

The groove 11 may be a pit or a channel, and multiple pits or multiple channels are arranged in a circumferential direction of the rotating shaft 1. The multiple grooves may be arranged in the same circumference, and may be evenly arranged, to ensure the connection stability.

One groove 11 or multiple grooves 11 may be arranged in the circumferential direction of the rotating shaft, and the specific number of the groove 11 is not limited as long as it can effectively ensure connection and fixation. The multiple grooves may be arranged in parallel with each other, and may be arranged at equal intervals, which are not limited specifically.

Opposite sides of the two bearings are each provided with a retainer ring 7 configured to prevent dust.

A method for machining and assembling a rotor includes the following steps.

(1) A rotating shaft is machined and formed, positions for fixing bearings, a rotor magnetic steel and a load blade on the rotating shaft are determined, and at least one groove is machined and formed at each of the fixing positions.

(2) Adhesive is filled in the grooves.

(3) The load blade, a retainer ring, the upper bearing, a pre-tightening spring, the lower bearing, a retainer ring and the rotor magnetic steel are respectively fixed to the rotating shaft in the listed sequence, meanwhile the pre-tightening spring is ensured to be in a pressed state.

A rotor is disclosed according to the present application, which is applicable to a vacuum cleaner motor. The rotor includes a rotating shaft, a rotor magnetic steel, a load blade, and two bearings between the rotor magnetic steel and the load blade, and a pre-tightening spring configured to provide precompressions to the bearings at two sides respectively. The bearings are arranged between the load blade and the rotor magnetic steel, thereby effectively eliminating structural limitations in the conventional technology, simplifying the structure of the motor, reducing an overall volume of the motor, and facilitating the machining and manufacturing of the vacuum cleaner motor.

The pre-tightening spring is arranged between the two bearings, and the pre-tightening force of the pre-tightening spring enables the bearings to be close to the load blade as much as possible, thereby reducing the wobble at shaft ends of the rotor, lowering the noise, reducing damages to the motor and improving the service life of the motor.

The two bearings and the pre-tightening spring cooperatively function, thereby ensuring the operational stability, and meanwhile effectively saving the material and reducing production costs.

An outer side of the rotating shaft is provided with grooves at circumferences corresponding to the rotor magnetic steel, the load blade and the bearings, and adhesive is filled into the grooves, to fix the components on the rotating shaft to the rotating shaft. Further, the provision of the grooves may further avoid spillage of the adhesive, and ensure the stability of the connection between the rotating shaft and the components thereon.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A method for machining and assembling a rotor applicable to a motor of a vacuum cleaner, wherein the rotor comprises a rotating shaft, a rotor magnetic steel, a load blade, a first bearing and a second bearing between the rotor magnetic steel and the load blade, and a pre-tightening spring configured to provide precompressions to the first bearing and the second bearing at two sides; and wherein, an outer side of the rotating shaft is provided with grooves in circumferences corresponding to the rotor magnetic steel, the load blade and the first bearing and the second bearing, and adhesive is filled in the grooves, and the rotor magnetic steel, the load blade, and the first bearing and the second bearing are all fixedly sleeved on the rotating shaft through the adhesive, wherein the method comprises the following steps:

(1) machining and forming the rotating shaft, determining positions for fixing the first bearing and the second bearing, the rotor magnetic steel and the load blade on the rotating shaft, and machining and forming at least one groove at each of the fixing positions;

(2) filling adhesive in the grooves; and (3) fixing the load blade, a first retainer ring, the first bearing, the pre-tightening spring, the second bearing, a second retainer ring and the rotor magnetic steel respectively to the rotating shaft such that the first retainer ring is located at a first direction side of the load blade, the first bearing is located at the first direction side of the first retainer ring, the pre-tightening spring is located at the first direction side of the first bearing, the second bearing is located at the first direction side of the pre-tightening spring, the second retainer ring is located at the first direction side of the second bearing, and the rotor magnetic steel is located at the first direction side of the second retainer ring, and meanwhile ensuring that the pre-tightening spring is in a pressed state.

2. The method according to claim 1, wherein the groove is a pit or a channel, and the pit is one pit or a plurality of pits arranged in a circumferential direction of the rotating shaft, and the channel is one channel or a plurality of channels arranged in the circumferential direction of the rotating shaft.

3. The method according to claim 1, wherein the groove is an annular groove arranged in a circumferential direction of the rotating shaft, one or a plurality of annular grooves are provided, and the plurality of annular grooves are arranged in parallel with each other and are arranged at equal intervals.

4. The method according to claim 1, wherein the groove has a rectangular, arc-shaped, U-shaped or polygonal cross section.

5. The method according to claim 1, wherein the pre-tightening spring is at least one pre-tightening spring pressed between the first bearing and the second bearing, and in a case that a plurality of pre-tightening springs are provided, the plurality of pre-tightening springs are arranged side by side.

6. The method according to claim 1, wherein two ends of the pre-tightening spring press tightly on outer races of the first bearing and the second bearing respectively.

7. The method according to claim 1, wherein opposite sides of the first bearing and the second bearing are respectively provided with the first retainer ring and the second retainer ring configured to prevent dust.

\* \* \* \* \*